Patented Sept. 28, 1954

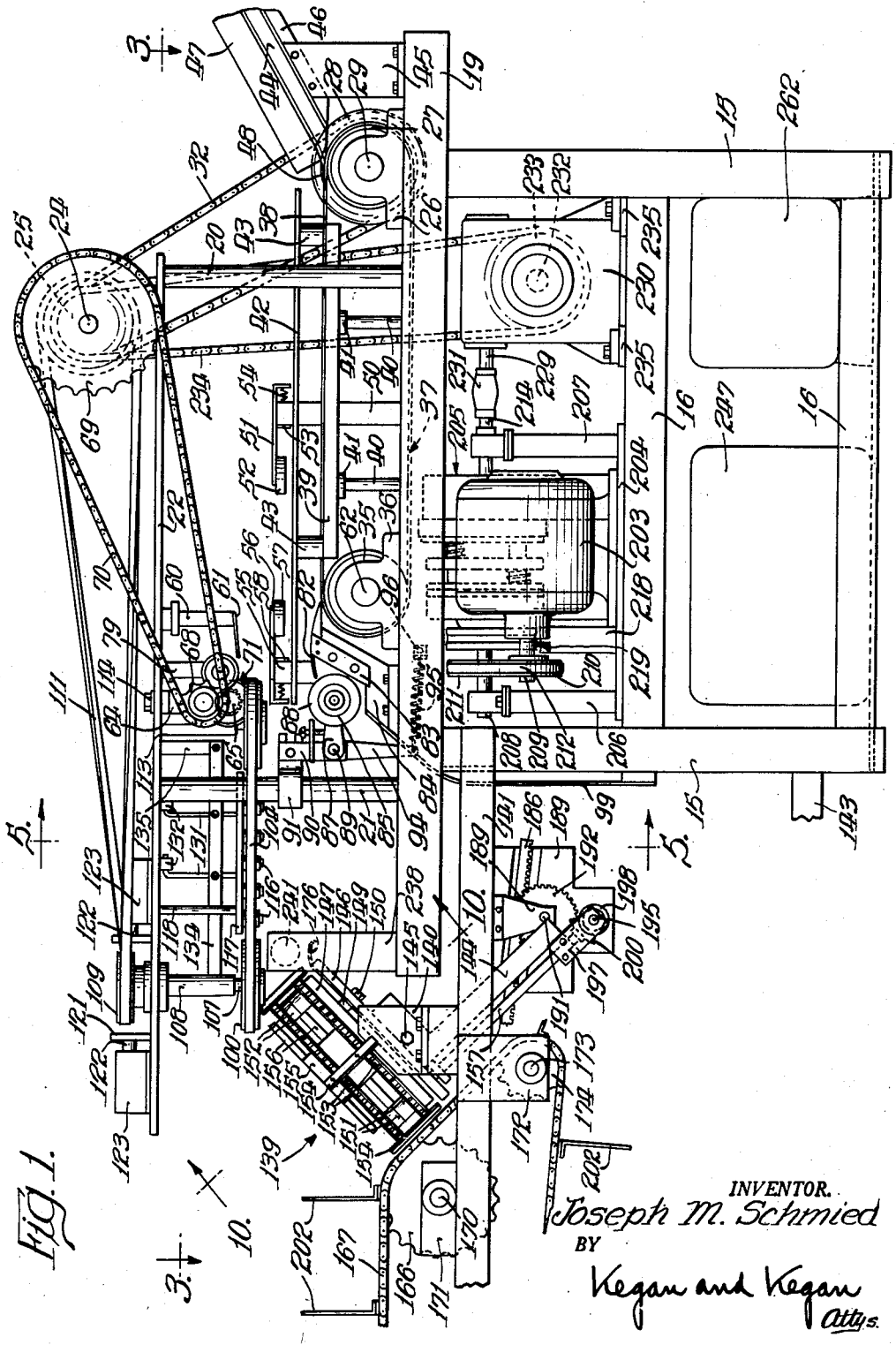

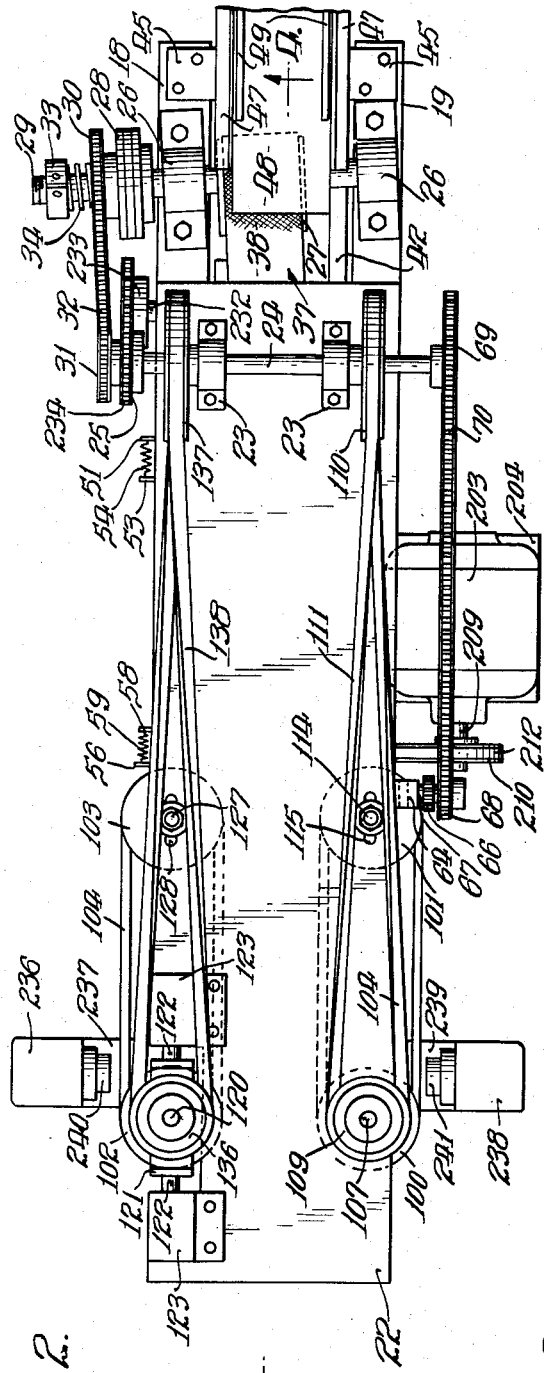
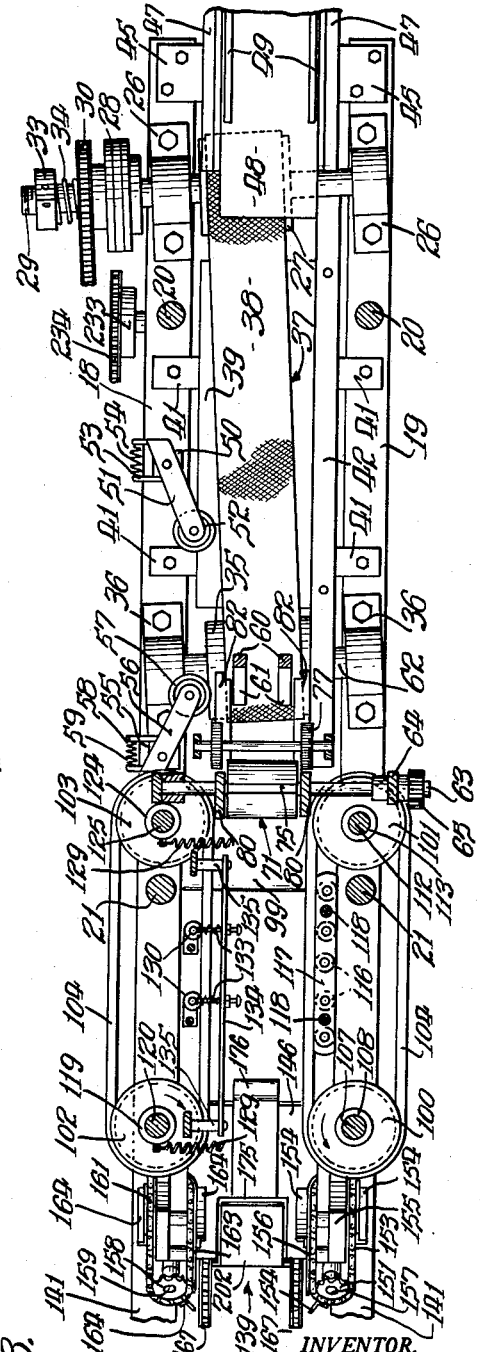

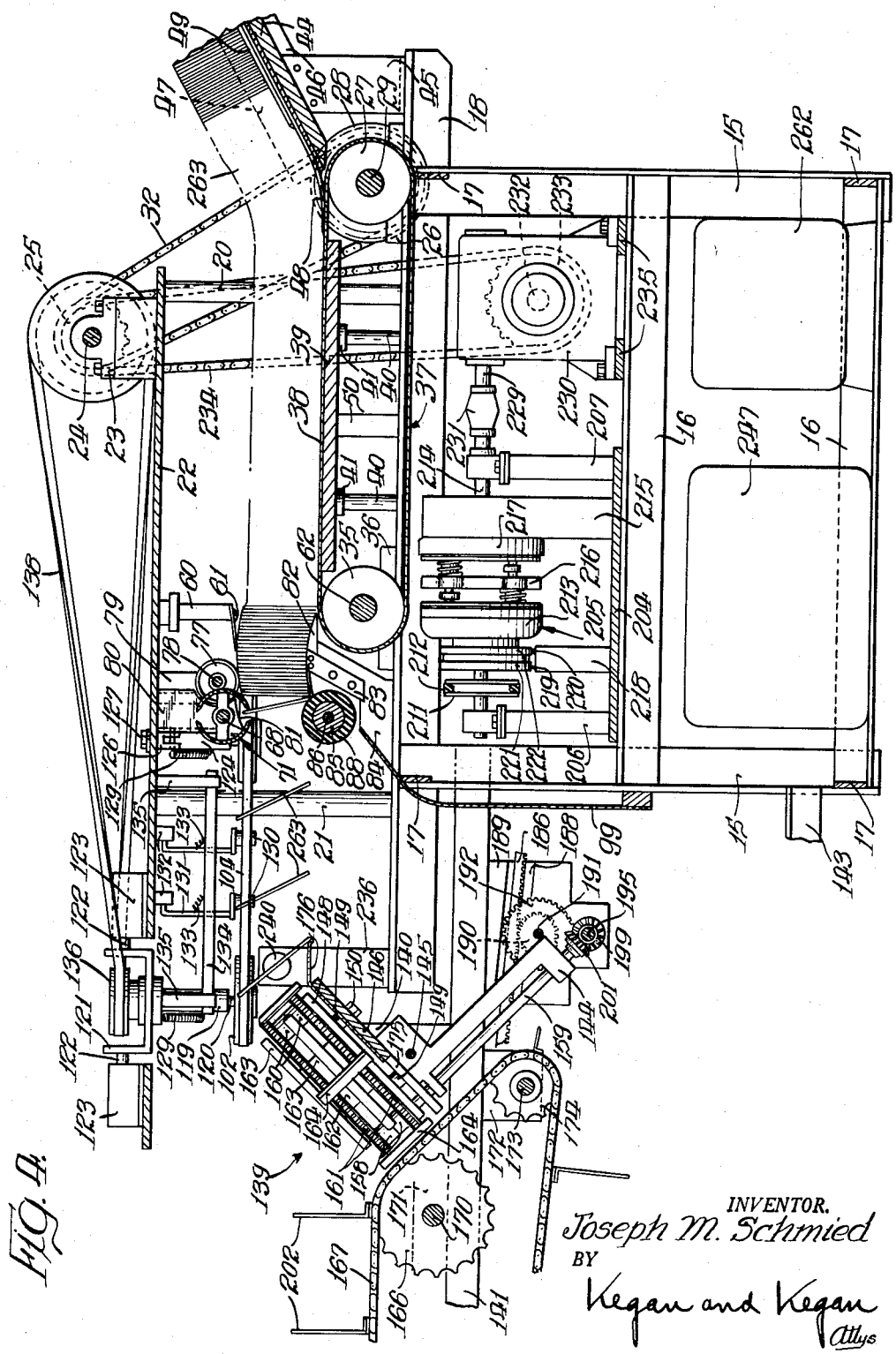

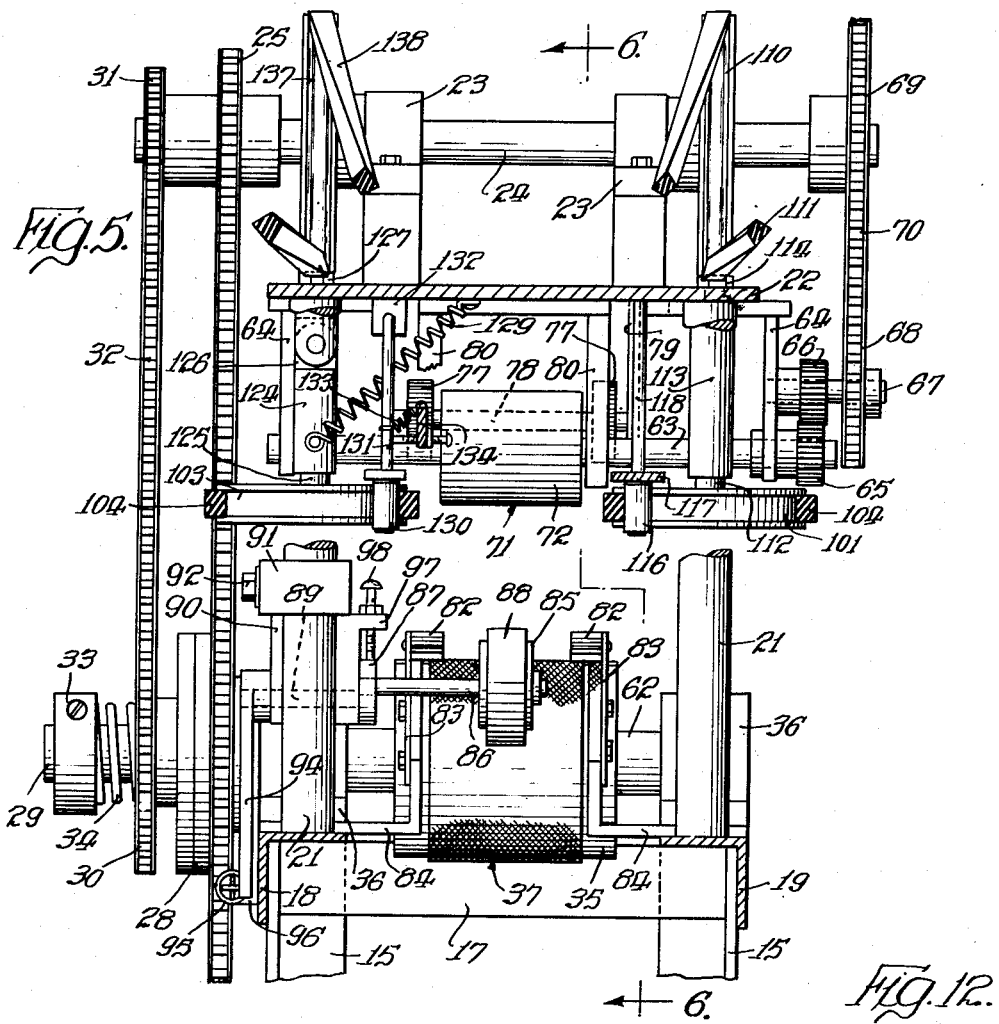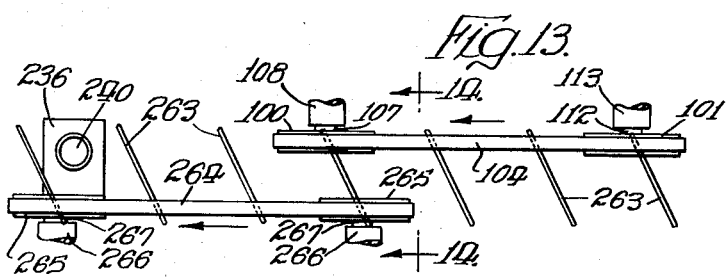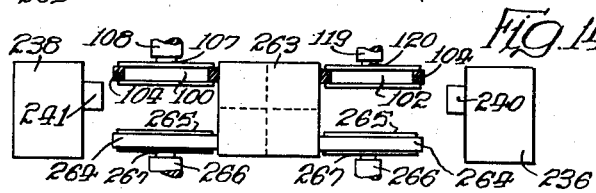

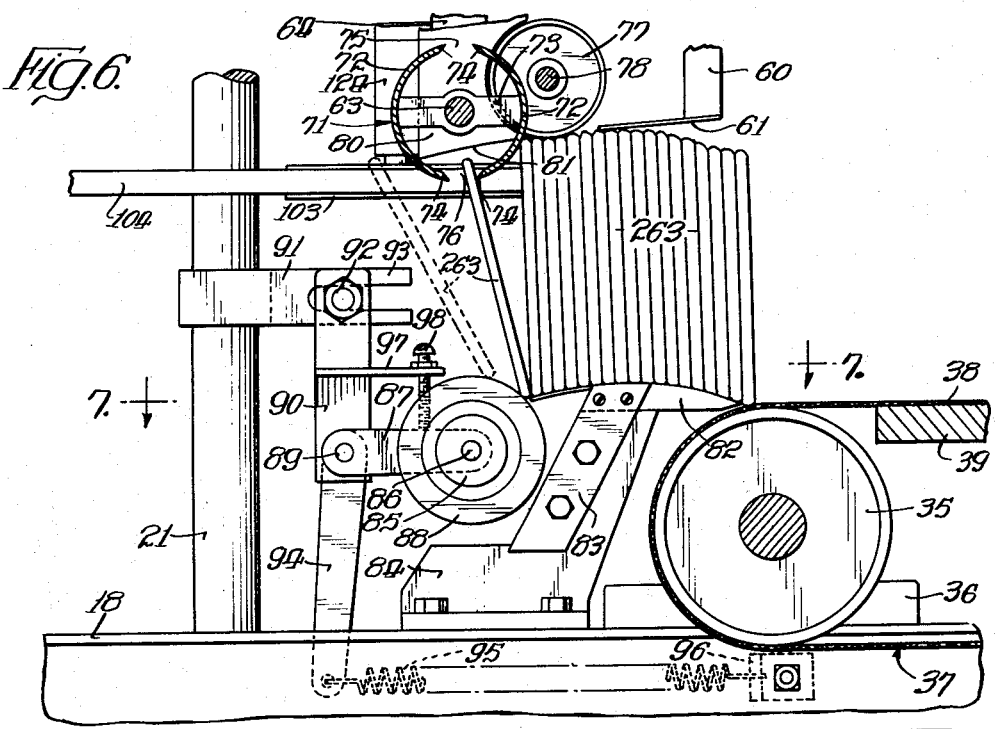
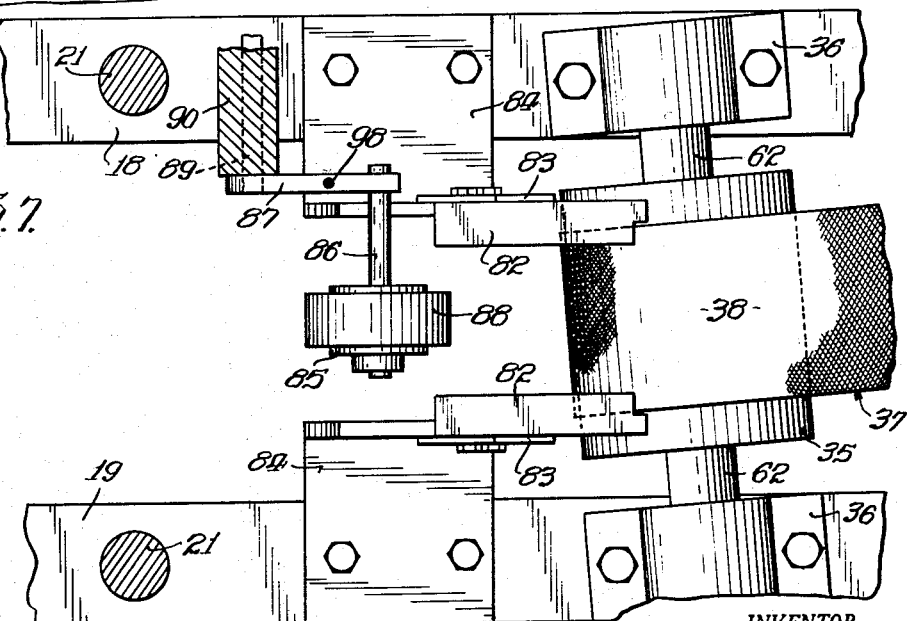

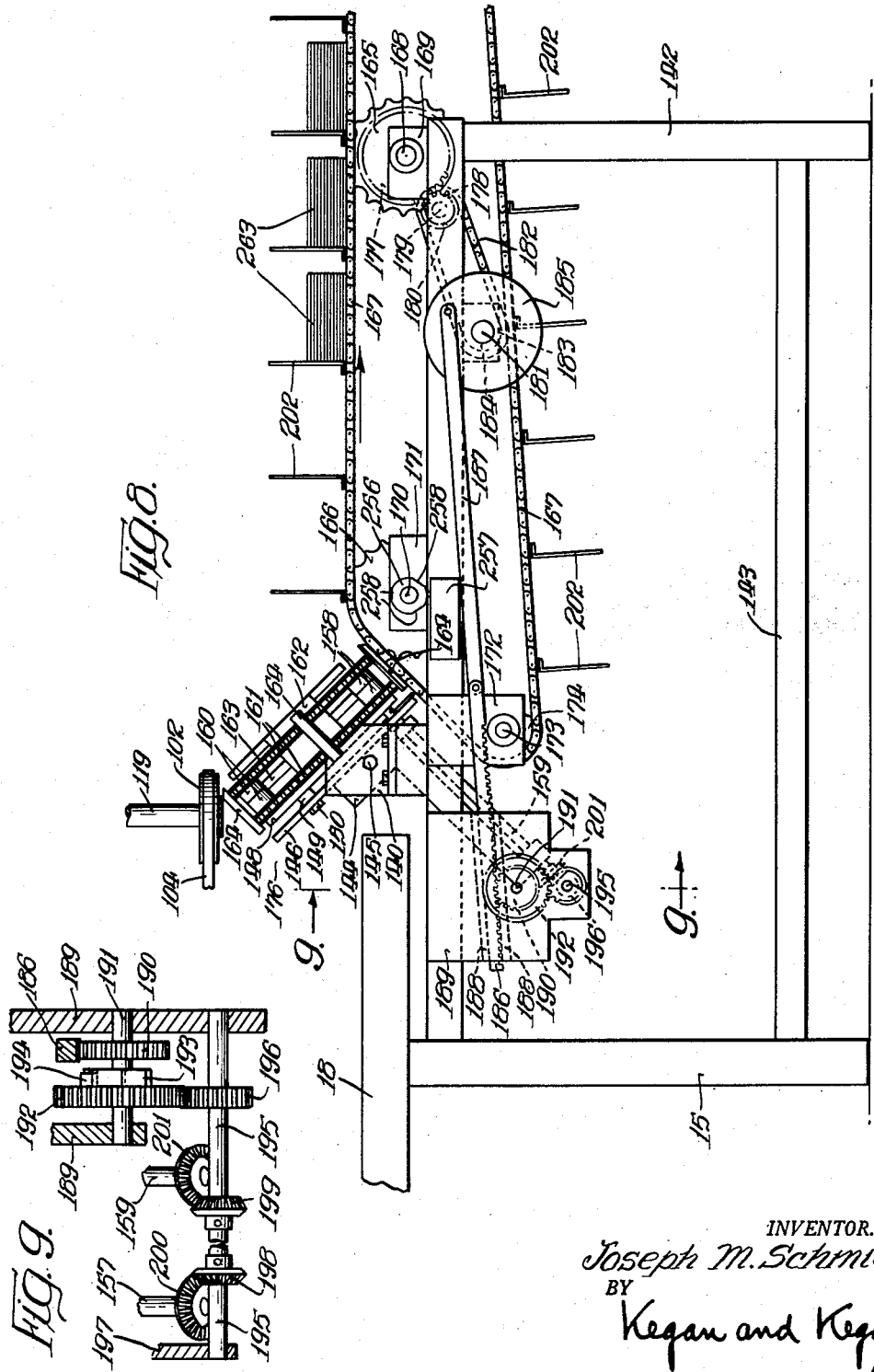

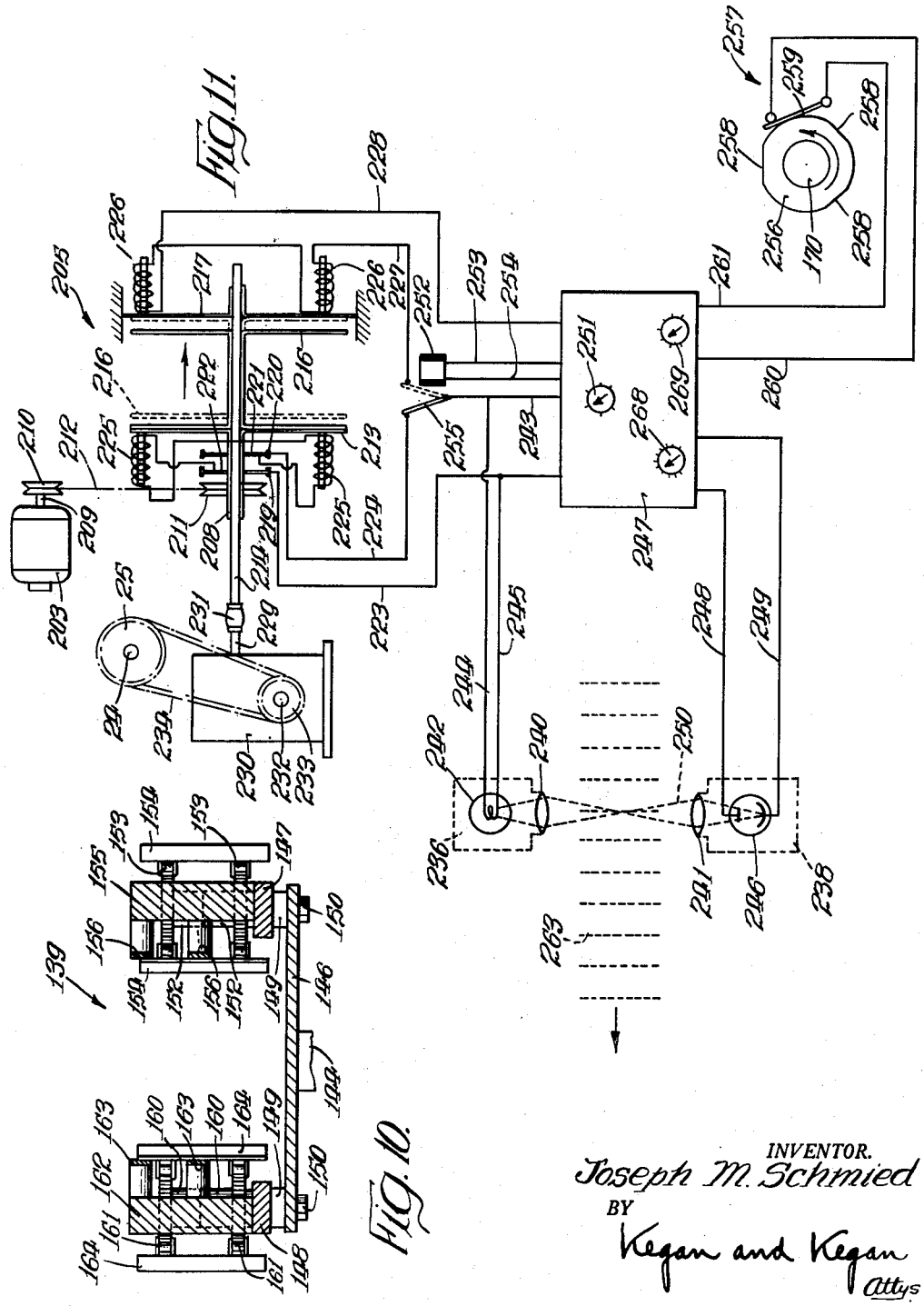

2,690,257

UNITED STATES PATENT OFFICE 2,690,257

ARTICLE HANDLING AND SORTING APPARATUS

Joseph M. Schmied, Chicago, Ill., assignor to Schulze and Burch Biscuit Co., Chicago, Ill., a corporation of Illinois Application April 26, 1950, Serial No. 158,219

16 Claims. (Cl. 209—72)

My invention relates generally to improvements in apparatus for handling tablet-like articles such as crackers, cookies, candy bars, tile, shingles, etc. More particularly, my invention relates to apparatus adapted to inspect, count out and deliver a predetermined number of tablet-like articles which are initially fed into the apparatus in large, unnumbered and unsorted quantities. In a more limited application, the invention relates to apparatus to successively collect unsorted crackers in a stack, separate each of said crackers from the stack, inspect each cracker and reject any which are imperfect, and thereafter collect a predetermined number of the inspected crackers in a stack suitable for wrapping and packaging.

As will become apparent as this exposition proceeds, the apparatus comprising my invention is particularly useful in connection with automatic packing and wrapping machinery. For example, a recent development in packaging soda crackers has been the break down and wrapping of the crackers in quarter-pound lots, a plurality of which are then packed in one-pound and two-pound boxes. This arrangement permits the consumer to have a fresh, crisp product right down to the last quarter-pound, whereas previously as soon as the package of crackers was opened, the entire contents were exposed to the air and as a result the crackers last to be used quite often were stale.

Before my invention, no apparatus was available capable of receiving unsorted crackers and thereafter automatically delivering lots of crackers having a predetermined number of inspected crackers therein. While there is apparatus available which is capable of counting out a predetermined number of crackers and arranging same in a stack, such apparatus does not incorporate the desirable features of inspecting the unsorted crackers and rejecting those which are broken or chipped; hence the damaged crackers may be packaged along with the sound crackers. It is highly desirable however that all defective crackers be eliminated from the package, to obtain full acceptance of the product by consumers. While it is possible to achieve a fully inspected product by hand packaging methods, the cost of such hand labor is rapidly becoming prohibitive in the highly competitive baking industry; moreover this practice poses a problem of maintaining the food proudcts strictly sanitary.

While the aforesaid problems present in the industry prior to perfection of my handling apparatus were of particular importance in the case of packaging soda crackers, like problems are present in varying degrees in the handling of other cracker-type products, such as graham crackers, Ry-Krisp, and cookies, as well as in the handling of such widely different types of articles as asphalt and rubber tiles, shingles, and chocolate bars. However, in view of the immediate commercial demand therefor, the embodiments of my invention disclosed in the drawings are especially adapted for use in handling soda crackers.

The principal object of my invention is to provide apparatus which receives tablet-like articles in bulk quantities, inspects said articles and continuously delivers the same in lots of predetermined number.

Another object of my invention is to provide apparatus which automatically rejects imperfect articles, without affecting the number of articles in the lots delivered by said apparatus.

Another object of my invention is to provide apparatus which operates at high speed, yet does not damage the article being handled, even though it be as fragile as a soda cracker.

Yet another object of the present invention is to provide article handling apparatus which may be arranged to discharge the inspected and stacked articles to other material handling apparatus, such as for example automatic packaging and wrapping machinery.

Another object is to provide article handling apparatus which collects soda crackers, and inspects, counts and stacks them in lots of a predetermined number, all in a highly automatic manner and without scraping the salt therefrom or breaking the blisters normally associated with this product.

To the end of achieving the foregoing objects, my invention comprises means for (1) receiving the unsorted tablet-like articles in bulk quantities, (2) selecting the articles one at a time and inclining the article from the vertical plane so that it must support its own weight, whereupon an article which is broken in a horizontal plane collapses and is rejected by the apparatus, (3) transferring the partially inspected article to a conveyor which grips two opposite sides thereof, whereupon an article which is broken in a vertical plane collapses and is rejected by the apparatus, (4) counting the inspected articles, and (5) stacking the articles until a predetermined number are assembled, whereupon the apparatus is automatically disengaged until the stack of inspected articles is removed therefrom. In one embodiment thereof, my apparatus also inspects automatically all four corners of a rectangular shaped article, and rejects said article in the event that any of the corners are broken.

In order that my invention may be more fully disclosed, reference is had to the accompanying drawings, which illustrate article handling apparatus embodying the foregoing and such other principles, advantages or capabilities as may be pointed out as this description proceeds, or as are inherent in the present invention. For purposes of clarity and exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a front elevational view of article handling apparatus comprising one embodiment of my invention, and which is particularly suited to the handling of soda crackers;

Figure 2 is a plan view of the apparatus of Figure 1;

Figure 3 is a fragmentary plan view taken in section on the line 3—3 of Figure 1;

Figure 4 is a front elevational view of the apparatus taken partly in section on the line 4—4 of Figure 2;

Figure 5 is an enlarged, fragmentary left side view taken in section on the line 5—5 of Figure 1;

Figure 6 is a fragmentary front view taken in section on the line 6—6 of Figure 5;

Figure 7 is a fragmentary plan view taken in section on the line 7—7 of Figure 6;

Figure 8 is a fragmentary rear elevational view showing the manner in which the embodiment of Figure 1 may be integrated with automatic wrapping and packaging apparatus;

Figure 9 is a fragmentary, enlarged right side view taken in section on the line 9—9 of Figure 8;

Figure 10 is a detail view taken in section on the line 10—10 of Figure 1;

Figure 11 is a diagrammatic view of the wiring diagram and controlling equipment forming a part of the apparatus of Figure 1;

Figure 12 is an enlarged cross-sectional view of the endless belt forming a part of the conveying mechanism of my apparatus;

Figure 13 is a fragmentary front elevational view showing somewhat schematically a modification of the combination conveying and inspecting mechanism of Figure 1; and Figure 14 is a right side view taken in section on the line 14—14 of Figure 13.

Like reference characters designate like parts in the drawings and in the description of my invention which follows.

Before proceeding with the detailed description of the construction and operation of the several parts comprising the embodiments shown in the drawings, and to better indicate the broad concepts of my invention, I describe, in brief outline below, the organization and coaction of the principal parts comprising said embodiment. More particularly, the apparatus includes (1) mechanism which receives, stacks, and aligns unsorted crackers which are fed to it; (2) mechanism which selects the foremost cracker from the stack in the receiving mechanism, and partially inspects said cracker, (3) conveyor mechanism which receives the partially inspected cracker and simultaneously inspects it additionally, and thereafter carries the cracker to a collecting station; (4) means for counting the crackers as they are conveyed; (5) drive mechanism for the prior designated mechanisms; (6) collecting mechanism which receives the inspected crackers from the conveying mechanism in stacked relation suitable for transfer to a wrapping and packaging device; and (7) control means actuated by said counting means which interrupt the drive mechanism after a predetermined number of crackers have been stacked in said receiving mechanism, and which maintain the apparatus inactive until said stack of crackers are removed from said collecting mechanism.

*Cracker receiving and stacking mechanism*

Referring now to the drawings, and more particularly Figure 1-4 thereof, my article handling apparatus is shown as including a frame comprising upright legs 15, stringers 16 and 17, and upper frame members 18 and 19. Two pairs of posts 20, 20 and 21, 21 extend upwardly from the frame members 18 and 19, and support a platform 22. A pair of bearings 23, 23, are secured to the platform 22, and journal the main drive shaft 24, which is driven through the drive sprocket 25. The drive means for the drive sprocket 25 are described in detail below.

As is best shown in Figure 3, two bearings 26, 26 are secured to the frame members 18 and 19 adjacent one end thereof, and provide support for the shaft 29 on which the conveyor pulley 27 is mounted. A slip clutch 28, which may be of conventional design, is secured to the shaft 29, the input side of the slip clutch 28 being driven by the drive sprocket 30 affixed thereto. A link belt 32 drivably connects the sprocket 30 to the sprocket 31 on the main drive shaft 24. The maximum torque which the slip clutch 28 will transmit is adjustable by means of the movable collar 33 and the spring 34. Since the drive sprocket 25 is rotated in a counterclockwise direction, as viewed in Figure 4, the conveyor pulley 27 also normally turns in a counterclockwise direction. Again referring to Figure 3, the shaft 62 of a second conveyor pulley 35 is rotatably supported on the frame members 18 and 19 by the two bearings 36, 36. A cracker conveyor belt 37 runs over the pulleys 27 and 35. Positioned beneath the upper span 38 of the conveyor belt 37 is a backing plate 39, which is supported on the frame members 18 and 19 by the posts 40 and the cross braces 41, 41.

As is best shown in Figures 1, 3 and 4, a chute 44 overlaps the conveyor belt 37 above the pulley 27, and is supported on the frame members 18 and 19 by the upright brackets 45, 45 and the supporting angle irons 46, 46. In the operation of my apparatus unsorted crackers are fed onto the chute 44, from which they are discharged onto the conveyor belt 37. A pair of side rails 47, 47 are mounted on the chute 44 parallel to each other, while a floor plate 48 is positioned between the side rails 47, 47 and extends from the chute 44 onto the upper span 38 of the conveyor belt 37. A pair of conveyor rails 49, 49 are secured to the floor plate 48, and terminate short of the discharge end of the chute 44.

Extending upwardly from the support member 39 on the spacers 43, 43, and positioned to one side of the conveyor belt 37, is a cracker aligning member 42. For a purpose which will be more fully explained below, the shafts 29 and 62 of the conveyor pulleys 27 and 35 are canted so that the upper span 38 of the belt 37 converges toward the guide member 42 as it moves toward the conveyor pulley 35.

Positioned on the other side of the conveyor belt 37 from the aligning member 42 is a post 50, which provides pivotal support for the bell crank 51 having a rotatable cracker aligning wheel 52 on one end thereof. The other end of the bell crank 51 is connected to the bracket 53 by a spring 54, which acts to urge the wheel 52 in the general direction of the guide member 42. Similarly, a post 55 extends upwardly from the frame member 18, and serves as a pivotal support for the bell crank 56, which also includes a rotatable cracker aligning wheel 57 on one end thereof. By means of the bracket 58 and the spring 59 interconnecting said bracket 58 to the other end of the bell crank 56, the wheel 57 is urged in the general direction of the aligning member 42. A pair of bars 60, 60 extend from the underside of the platform 22, and support the cantilever spring fingers 61, 61.

*Cracker selecting and inspecting mechanism*

Referring now to Figures 5 and 6, a shaft 63 is positioned beneath the platform 22, and is supported by the brackets 64, 64. A gear 65 is secured to one end of the shaft 63, and meshes with the gear 66 on the countershaft 67, which shaft 67 is in turn driven from the main drive shaft 24 through the drive sprockets 68 and 69 and the interconnecting link belt 70. A cylindrical rotary separator member indicated generally by the numeral 71 is secured to the shaft 63, and comprises two shell-like plates 72, 72 connected together by the cross member 73. The adjacent lip portions 74 of the plates 72, 72 are substantially parallel to each other, and form two diametrically opposed slot openings 75 and 76. The inner edges of the lip portions 74 delineating each of the slot openings 75 and 76 are beveled divergently, as shown in Figure 6.

As will become apparent as this exposition proceeds, the rotary separator member 71 acts to select and remove crackers which are disposed on the conveyor belt 37 from the chute 44, and in addition, partially inspects the crackers as they are removed.

Two idler wheels 77, 77 are positioned at opposite ends of the rotary separator member 71, and rotate on the shaft 78, which is supported by the brackets 79, 79 extending downwardly from the platform 22. Two guide members 80, 80 are also positioned at opposite ends of the separator member 71, and each includes a guide surface 81 which is substantially tangent to the periphery of its corresponding idler wheel 77.

Extending from the conveyor belt 37, and on opposite sides thereof, are two ramps 82, 82. The ramps 82, 82 are secured to straps 83, 83, which extend from brackets 84, 84 on the frame members 18 and 19. As is best illustrated in Figure 6, each of the ramps 82 is curved substantially in an arc. An idler wheel 85, having a soft resilient facing 86 thereon is positioned intermediate and substantially in alignment with the forward ends of the ramps 82, 82. The wheel 85 is freely rotatable on the shaft 86, which extends from the arm 87 on one end of the shaft 89. The shaft 89 is journaled by the block 90, which block is adjustable along the support arm 91 on the post 21 by means of the fastener 92 and the adjustment slot 93. A second arm 94, on the other end of the shaft 89, is urged in a counterclockwise direction, as viewed in Figure 6, by the spring 95 which is anchored to the bracket 96 on the frame member 18. An arm 97 extends from the block 90, and includes an adjustable stop member 98 which limits the upward deflection of the idler wheel 85. As shown in Figure 1, a deflector 99 extends from beneath the idler wheel 85 downwardly and away from said wheel 85.

*Cracker conveying and inspection mechanism*

As shown in Figures 1–3, a first pair of pulleys 100, 101, and a second pair of pulleys 102, 103 are mounted for rotation in a single plane which intersects or is just beneath the lowermost portion of the rotary separator member 71. The first pair of pulleys 100, 101 are positioned to one side of the separator member 71 and have an endless belt 104 running thereover, while the second pair of pulleys 102, 103 are positioned on the other side of the selector member 71 and also support an endless belt 104. Each of the belts 104, 104 consists of a backing strip 105 and an outer facing 106 attached to the strip 105 (Figure 12), the outer facing 106 preferably being composed of a soft, resilient material such as foam rubber latex. Adjacent spans of the belts 104, 104 are substantially parallel to each other, and spaced apart a distance corresponding to the width of the crackers which the apparatus is handling. Briefly, the purpose of the conveyor mechanism thus far described is to receive the crackers from the rotary selector member 71 and convey them by gripping the vertical edges thereof.

The pulley 100 is secured to a shaft 107 which is journaled by the sleeve 108 on the platform 22. The shaft 107 is in turn keyed to a drive pulley 109, which is connected to the pulley 110 on the main drive shaft 24 by the endless belt 111. A shaft 112 rotatable in the sleeve 113 supports the pulley 101, and by means of the fastener 114 and the adjustment slot 115 in the platform 22, the tension on the endless belt 104 of the pulleys 100 and 101 may be adjusted. The inner span of said belt 104 is supported by the backing rolls 116 (Figure 5), which are rotatably secured to the strap 117 hung from the platform 22 by the rods 118.

As best shown in Figure 4, the sleeve 119, in which the shaft 120 of the pulley 102 is journaled, is secured to a channel-shaped member 121 the outwardly extending pintles 122, 122 of which are pivotally supported by the trunnions 123, 123 on the platform 22. Similarly, the bearing sleeve 124 of the shaft 125 of the pulley 103, is pivotally secured to the clevis 126, which is adjustably secured to the platform 22 by the fastener 127 extending through the adjustment slot 128. The pulleys 102 and 103 may therefore be moved either away from or toward the other pair of pulleys 100 and 101, to adjust the distance between the adjacent parallel spans of the endless belts 104, 104. In actual practice, the springs 129, 129 act to move the pulleys 102 and 103 to decrease the distance between the adjacent spans of the belts 104, 104.

A pair of backing rolls 130, 130 are carried on the rods 131, 131, which are pivotally supported by the blocks 132, 132. The rods 131, 131 are connected by the springs 133, 133 to a fixed bar 134, which is hung from the platform 22 by the spacers 135, 135. By means of this arrangement, the backing rolls 130 are at all times held against the inner side of the endless belt 104 running over the pulleys 102 and 103.

The upper end of the shaft 120 is keyed to a drive pulley 136, which in turn is connected to the pulley 137 on the main drive shaft 24 by the endless belt 138. By means of the crossed-belt arrangement shown, as the main drive shaft 24 turns in a counterclockwise direction, as viewed in Figure 4, the inner spans of the endless belts 104, 104 each move away from the rotary selector member 71.

*Drive mechanism*

The drive mechanism for the apparatus described above, includes an electric motor 203 mounted on the cross plate 204, and a magnetic clutch mechanism indicated generally by the numeral 205. The outer end of the input shaft 208 of the clutch mechanism 205 is supported by the pedestal bearing 206 and is driven by the drive shaft 209 of the motor 203, through the drive pulley 210, the driven pulley 211, and the interconnecting belt 212. The electric motor 203 normally is operated continuously, to drive a rotatable plate 213 on the input shaft 208. The output shaft 214 of the clutch mechanism 205 extends to each side of the fixed member 215 and is supported at one end thereof by the pedestal bearing 206. A clutch-brake plate 216 is keyed to and shiftable along the output shaft 214, and may be moved between a position wherein it drivably engages the rotatable plate 213, or contacts the brake plate 217 secured to the fixed member 215.

A brush support member 218 extends upwardly from the cross plate 204 beneath the input shaft 208. Two brushes 219 and 220 project upwardly from the brush plate 218 to contact the slip rings 221 and 222 on the shaft 208. Energy is supplied to the brushes 219 and 220 through the leads 223 and 224, to energize a plurality of solenoids 225 carried by the rotatable plate 213. Upon energizing the solenoids 225, the clutch-brake plate 216 is moved to the position shown in Figure 11, whereupon the output shaft 214 turns. A plurality of solenoids 226 are carried by the brake plate 217, and are energized through the leads 227, 228. When the solenoids 226 are energized, the clutch-brake plate 216 is attracted to the brake plate 217, whereupon any rotary motion which may have been imparted to the output shaft 214 is stopped.

The output shaft 214 of the clutch mechanism 205, is connected to the input shaft 229 of the gear reduction unit 230, through the flexible coupling 231. Straps 235, 235 support the unit 230 between the stringers 16, 16. Secured to the output shaft 232 of the gear reduction unit 230 is a drive sprocket 233, which is drivably connected to the drive sprocket 25 through the link belt 234. Accordingly, when the clutch-brake plate 216 is in the position shown in Figure 11 and the electric motor 203 is turning, the main drive shaft 24 also rotates, although at a very much reduced angular velocity. Conversely, when the solenoids 226 have attracted the clutch-brake plate 216 to the position shown in dotted outline in Figure 11, the output shaft 214 is braked and stopped.

*Cracker counting and control mechanism*

As a part of my apparatus, I include mechanism which is adapted to count crackers conveyed by the belts 104, 104, and to automatically stop the drive mechanism of the apparatus as soon as a predetermined number of said crackers have been discharged from said belts 104, 104. In the embodiment of my apparatus shown in the drawings, this counting mechanism comprises a phototube relay counting circuit. The light generating unit 236 is mounted on a bracket 237 extending to one side of the frame member 18. A light receiving, or phototube unit 238 is mounted on a bracket 239 which extends oppositely from the frame member 19. The lens 240 (Figure 4) of the light generating unit 236 is positioned just below one of the belts 104. The lens 241 (Figure 1) of the phototube unit 238 is positioned in alignment with the lens 240. As best shown in Figure 11, the light generating unit 236 includes a lamp 242 the leads 244 and 245 which are connected across the lead 223 and the common lead 243 of the control unit 247. The light receiving unit 238 includes a phototube 246 which is connected to the control unit 247 through the leads 248 and 249. A rectifier unit 262 (Figure 1) is connected to the control unit 247 to supply direct current thereto, for operating the solenoids 225 and 226.

Each time that the light beam 250 between the lenses 240 and 241 is interrupted by the passage of a cracker therethrough, the phototube 246 sends an impulse to the control unit 247. Said control unit 247 is of known type and operates a control device only after a predetermined number of impulses have been received from the phototube 246. By means of the control knob 251, the number of impulses—i. e. the number of crackers—required to operate the control device may be adjusted. In the apparatus shown in Figure 11, the control device actuated by the control unit 247 comprises a relay 252, which is energized through the leads 253 and 254 to position a switch element 255 to connect the common lead 243 to either the lead 224 or the lead 227.

The control knob 268 on the control unit 247 provides for adjustment of the voltage impressed upon the solenoids 225, whereby the rapidity with which the clutch-brake plate 216 is drivably engaged with the rotatable plate 213 can be adjusted. Similarly, the voltage impressed across the solenoids 226 is adjustable by means of the control knob 269, thus providing for adjustment of the time required for the solenoids 226 to brake completely the rotation of the plate 216 each time the lead 227 is connected to the common 243. In this way the apparatus can be set so that the apparatus is stopped after the last of the desired number of crackers has passed through the light beam 250, but before the next succeeding cracker reaches said light beam 250.

*Cracker collecting, stacking and transferring mechanism*

Positioned adjacent to the discharge end of the cracker conveying and inspecting mechanism described above, is a cracker collecting and transferring unit designated generally by the numeral 139, the purpose of which is to receive the crackers as they are discharged from the belts 104, 104 and stack them into lots each of which contains a predetermined number of crackers. Figures 1 and 4 show the unit 139 as being mounted on a pair of angle brackets 140, 140 which extend upwardly from a framework comprising horizontal frame members 141, 141, upright legs 142, 142, and stringers 143, 143. More particularly, the unit 139 includes a drive support member 144 secured to the brackets 140, 140 by the fasteners 145, 145. A plate 146 having an opening 175 in the lower end portion thereof overlies the upper surface of the drive support 144, while two side members 147, 148 are positioned above the plate 146 on opposite sides thereof, and secured in this position by the spacers 149 and the fasteners 150. A guide strip 176 is also secured to the plate 146, to assist in guiding crackers thereon as they are discharged from the belts 104, 104. Extending upwardly from one end of the side member 147 are two sprockets 151, 151, while a second pair of sprockets 152, 152 extend upwardly from the side member 147 just below the discharge end of the belts 104, 104. Two endless link belts 153, 153 are mounted on the sprockets 151, 151 and 152, 152, while a plurality of conveyor flights 154 (four in the embodiment shown) are spaced uniformly around the link belts 153, 153. A bracket 155 extends upwardly from the side member 147 intermediate the two spans of the belts 153, 153 (Figure 10), to position two guide strips 156, 156 on the inner side of the bracket 155 to align the conveyor flights 154 upon movement thereof. A drive shaft 157 is journaled in the drive support 144, and is drivably connected to the sprockets 151, 151.

Similarly, a third pair of sprockets 158, 158 extend upwardly from the side member 148, and is driven by the drive shaft 159 on the drive support 144. A fourth set of sprockets 160, 160 is positioned on the side piece 148 opposite from the sprockets 152, 152, while two endless link belts 161, 161 run over the sprockets 158, 158 and 160, 160. A bracket 162 extends upwardly from the plate 146 to provide two guide strips 163, 163 for aligning the conveyor flights 164 carried by the endless link belts 161, 161.

In practice, the action of the collecting and transferring unit 139 is integrated with wrapping and packaging machinery, which may be of conventional design. By way of illustrating the operation of my apparatus, the collecting and transferring unit 139 is shown in Figure 8 to be integrated with the loading portion of one well known type of wrapping and packaging machinery. More particularly, such machinery includes sets of conveyor sprockets 165, 165 and 166, 166, over which endless link belts 167, 167 run. The shaft 168 of the conveyor sprockets 165, 165 is journaled in the bearings 169, 169 on the frame members 141, 141, while the shaft 170 of the sprockets 166, 166 is supported by the bearings 171, 171. As further shown in Figures 1 and 8, two bracket plates 172, 172 extend downwardly from the frame members 140, 141, and support a shaft 173 on which are mounted two conveyor sprockets 174, 174. The position of the wheels 174, 174 is such that the endless link belts 167, 167 move across the lower end of the plate 146, to carry the conveyor flights 202 through the opening 175 in said plate 146.

The link belts 167, 167 are normally driven by the wrapping and packaging machinery, hence as the belts 167, 167 are driven the sprockets 165, 165 are rotated. A gear 177 is fixed to the shaft 168, and turns the countershaft 179 through the gear 178. A sprocket 180 turns with the countershaft 179 and drives the shaft 181 through the link belt 182 and the sprocket 183. Said shaft 181 is journaled in a block 184 suspended from the frame members 141, 141. Crank member 185 is secured to the shaft 181, and is drivably connected to the rack 186 through the connecting rod 187. A pair of guide members 188, 188 are secured to the frame member 189, and constrain the rack 186 to reciprocating motion. Thus, as the sprockets 165, 165 turn, the rack 186 reciprocates back and forth.

Referring now to Figure 9, as the rack 186 reciprocates, it oscillates a pinion gear 190 on the shaft 191. A spur gear 192 is rotatable on the shaft 191, and is drivably connected thereto for rotation in one direction only, through the action of the ratchet 193 on the shaft 191 and the pawl 194. As the spur gear 192 is rotated intermittently, it drives the shaft 195 through the spur gear 196. The shaft 195 in turn is rotatably supported by the frame member 189 and the bracket piece 197 secured to the drive support 144 (Figure 1). Two bevel gears 198 and 199 are secured to the shaft 195, and mesh with bevel gears 200, 201 on the lower ends of drive shafts 157 and 159. Thus, as the link belts 167, 167 move at a uniform velocity, the drive shafts 157 and 159 move the link belts 153, 153 and 161, 161 intermittently. The driving ratio between the sprockets 165, 165, and the sprockets 150, 151 and 158, 158 is such that each time one of the conveyor flights 202 passes through the opening 175 in the plate 146, the conveyor flights 154 and 164 travel one-quarter of the distance around their respective sprockets 151, 152, 158 and 160.

Referring now to Figure 8, a cam 256 is secured to one end of the shaft 170, and operates the switch unit 257 shown schematically in Figure 11. The cam 256 is provided with three flats 258, 258, 258 spaced uniformly about the periphery of said cam 256. A switch 259 is positioned to be in engagement with the cam 256, and is connected to the control unit 247 through the leads 260 and 261. As each of the flats 258 moves past the switch 259 said switch is opened, whereupon the control unit 247 energizes the relay 252, to connect the common 243 to the lead 224. The rotary speed of the shaft 170 is such that the time interval required for the cam 256 to complete one-third of a revolution, is substantially longer than the time required for the predetermined number of articles to be carried by the belts 104, 104 through the beam of light 250.

*Mode of operation of apparatus*

In using my cracker handling machine, the crackers, generally indicated by the numeral 263, are fed on to the chute 44, with said crackers being arranged on edge. The crackers 263 may be hand loaded on to the chute 44, but preferably said chute 44 is connected directly to the shingle stacking conveyor on which the crackers are ordinarily stacked as they leave the baking ovens. As the sheets of crackers pass along the shingle stacking conveyor, they may be automatically broken into squares containing four individual segments or crackers each. These latter squares may then be diverted onto the chute 44. As the crackers 263 move down the chute 44, the lower corners thereof are supported by the conveyor rails 49, 49. If one of the two bottom corners of a cracker 263 is broken, the cracker drops downwardly on that particular side, and is easily detected by the operator, who can then remove the defective cracker.

As the crackers 263 move down the chute 44, they slide on to the conveyor belt 37 which then conveys them toward the rotary separator member 71. Because the conveyor belt 37 moves divergently toward the guide member 42, the crackers 263 are in accurate horizontal alignment as they approach the rotary separator member 71. The rotatable wheel 52 on the spring loaded bell crank 51 also assists in achieving this horizontal alignment. The forward travel of the upper span 38 of the conveyor belt 37 moves the aligned crackers onto the ramps 82, 82, which acts to guide the crackers 263 against the rotary separator member 71 and the idler wheel 85, in the manner shown in Figure 6. The rotatable wheel 57 on the spring loaded bell crank 59, and the cantilever spring fingers 61, 61 act to maintain the crackers 263 in accurate alignment as they move on to the ramps 82, 82.

The downward inclination of the ramps 82, 82 adjacent to the idler wheel 85 acts to slide the foremost cracker 263 in the stack thereof downwardly a small distance (e. g. about $\tfrac{1}{16}$ inch) relative to the next adjacent cracker 263 in the stack. This small amount of slippage between the foremost cracker 263 and the next adjacent cracker 263 has proven advantageous, since it facilitates the insertion of the upper edge portion of the foremost cracker 263 in the slot opening 75 (or 76) of the rotary separator member 71.

I have found that the slight amount of slippage which occurs between the crackers 263 as they move downwardly on the ramp 82, 82 does not scrape or rub any of the salt particles off of said crackers 263. This is highly desirable, for the reason that the consumer has come to expect and looks for a sprinkling of salt on soda crackers. Similarly, it is customary to form and to bake soda crackers in such a way that they have a pattern of blisters thereon. It is therefore desirable in handling soda crackers to avoid stacking or otherwise handling them in such a manner as to crush or break the aforesaid blisters. This I accomplish by setting the slip clutch 28 so that the compressive forces acting on the crackers 263 while stacked in my machine are at all times substantially less than those at which the blisters are broken or the crackers themselves crushed.

Referring again to Figure 6, as the rotary separator member 71 turns in a clockwise direction, the upper edge portion of the foremost cracker 263 in the stack thereof commences to move into the slot opening 75 as soon as the leading lip portion 74 has moved past said upper edge, due to the forwardly moving force exerted on the stack of crackers 263. The lagging lip portion 74 thereafter cams its way between the upper edge portion of the leading cracker 263, and the next adjacent cracker. As the rotary separator member 71 continues to rotate, the upper edge portion of the cracker 263 is displaced away from the stack, as in the manner of the cracker 263 shown inserted in the slot opening 76 in Figure 6. As the cracker 263 is thus being removed from the stack thereof on the conveyor belt 37, the idler wheels 77, 77 guide it beneath the guide surface 81 of the guide member 80, which maintain the cracker 263 in the desired position.

As further shown in Figure 6, the idler wheel 85 momentarily constrains the lower edge portion of the cracker 263 which is being displaced from the stack. In this way, each cracker 263 which is selected from the stack is inclined from the vertical, with the upper edge portion thereof between the lip portions 74, 74 of the slot 75 (or 76). In actual practice the operation of the member 71 is so rapid that the lagging lip portion 74 is in contact with the upper edge portion of the selected cracker 263. Since each of the slot openings 75 and 76 is somewhat wider than the cracker 263 is thick, said cracker 263 must therefore support its own weight by virtue of its bending strength. Accordingly, any cracker 263 which is broken horizontally will not hold itself in the inclined position shown in Figure 6, and consequently collapses and falls out of the rotary selector member 71 before it is gripped by the belts 104, 104. The deflector 99 carries the rejected cracker 263 clear of the drive mechanism. By means of the adjustable stop member 98, the idler wheel 85 may be set to give the proper support to the bottom edge of the cracker 263 which is being separated. It is also apparent from this figure, that as each cracker 263 is being displaced and inspected, that the balance of the stack is held back by the shell-like plates 72, 72 until such time as one of the slot openings 75, 76 engages the upper edge portion of the leading cracker 263.

Thus in effect the rotary separator member 71 may be considered as two elements: a restraining element which moves relative to the stack in a recurring cycle to hold the stack back, and a selector element which cams or wedges its way between the foremost cracker 263 and the next succeeding one as the restraining element disengages momentarily from the stack.

As the rotary selector member 71 continues to rotate, the cracker 263 selected thereby is gripped by the outer facings 106, 106 of the endless belts 104, 104. As the member 71 carries the cracker 263 between the belts 104, 104, the idler wheel 85 acts as a guide surface for the lower edge portion of said cracker 263, with the result that said crackers are inclined in the manner depicted in dotted outline in Figure 6. As mentioned previously, the pulleys 102 and 103 are shiftable to vary the distance between the parallel adjacent spans of the belts 104, 104. Moreover, said pulleys 102 and 103 move automatically to compensate for varying widths of crackers 263, since there is ordinarily a small variation in the dimensions of most bakery products. The tension of the springs 129, 129 (Figure 3) is such, however, as to cause the soft outer facings 106, 106 of the belts 104, 104 to grip securely the crackers 263 therebetween.

Unbroken soda crackers are characterized by a relatively high resistance to bending when gripped in the manner shown in the drawings; however any cracker which is broken in a vertical plane collapses and falls from between the belts 104, 104. At the same time, any cracker 263 the upper corners of which are broken or damaged also will fall from between the belts 104, 104. Accordingly, using the apparatus of Figures 1–12, each cracker 263 is individually inspected and any cracker which is broken either vertically or horizontally, or which has an upper corner thereof broken away, is automatically rejected. As mentioned previously, the conveyor rails 49, 49 on the chute 44 make it a simple matter to detect crackers the bottom corners of which are broken or damaged; hence each cracker 263 may be completely inspected for breakage.

In actual practice, my apparatus not only inspects the articles being handled, but at the same time counts out the inspected articles in a predetermined number, loads said predetermined number into the collecting and transferring unit 139 and then stops until the crackers are removed from said unit 139. Following this the cycle is repeated as long as crackers 263 are fed into the apparatus. To achieve this general object, the wrapping and packaging machinery shown in Figure 8 is set so that the belts 167, 167 move at a predetermined, constant rate, while the collecting and transferring unit 139 moves through one-quarter of the cycle of operation each time that a flight 202 moves upwardly through the opening 175 in the plate 146. As will become apparent as this exposition proceeds, however, the wrapping and packaging machinery, and the collecting and transferring unit 139 could just as well be set so that the unit 139 runs continuously, while the belts 167, 167 run intermittently.

Referring more particularly to the apparatus of Figure 8, as the shaft 170 turns, one of the flats 258 on the cam 256 opens the switch 259 (Figure 11), whereupon the switch element 255 is moved by the relay 252 to connect the common 243 to the leads 224, and energize the solenoids 225. Since the electric motor 203 is normally continuously rotating the input shaft 208 of the clutch mechanism 205, movement of the clutch-brake plate 216 into driving connection with the rotatable plate 213 causes the output shaft 214 to rotate. The gear reduction unit 230 therefore rotates the main drive shaft 24 (Figure 2), from which the selector member 71 is driven. The conveyor belt 37 is driven only as long as the pressure which it exerts on the stack of crackers 263 does not exceed a preset limit. Simultaneously, the pulleys 100 and 102 are driven by the belts 111 and 138, respectively, so that the adjacent parallel spans of the belts 104, 104 move from the rotary separator member 71 toward the unit 139. As the rotary selector member 71 moves in a recurring cycle relative to the stack of crackers 263, it successively selects, removes, and inspects the foremost cracker therein, and thereafter transfers it to the belts 104, 104. As the crackers move along the belts 104, 104 toward the unit 139, they interrupt the light beam 250 (Figure 11). Each time this occurs an impulse is transmitted from the phototube 246 to the control unit 247. As soon as a predetermined number of these impulses are received (i. e. a predetermined number of inspected crackers are counted), the relay 252 is energized to move the switch element 255 to the position shown in dotted outline in Figure 11. This results in the solenoid 225 being deenergized, and the solenoid 226 being energized. Consequently, the clutch-brake plate 216 is moved into engagement with the brake plate 217, and rotation of the shaft 214 stopped. Simultaneously, the worm gearing in the gear reduction unit 230 acts as a brake on the balance of the drive mechanism. This braking action, together with the dampening action of the flexible coupling 231, quickly stops the apparatus, yet imposes little shock thereon.

As the crackers 263 are moved along by the belts 104, 104 the lower edge portion thereof strike the guide strip 176 on the plate 146. This inclines the crackers 263 somewhat more than the position shown in Figure 4, so that as the crackers are discharged from the belts 104, 104, they drop into the unit 139 in stacked relation. As the crackers 263 are being discharged into the unit 139, said unit remains in the position shown in Figure 4, so that the conveyor flights 154 and 164 provide a surface against which the crackers 263 stack. During this time, one of the flights 202 on the link belts 167, 167 is moving up toward the opening 175 in the plate 146. After the predetermined number of crackers 263 has already been stacked in the unit 139, the crank member 185 oscillates the rack 186 in cooperation with the pawl 194 and ratchet 193, to move the link belts 153, 153 and 161, 161 through one quarter of a cycle. When this occurs, the stack of crackers 263 in the unit 139 is moved down and immediately over the oncoming flight 202. Since the belts 167, 167 are moving continuously, the flight 202 carries the stack of crackers 263 out of the unit 139 and along the belts 167, 167 toward the wrapping and packaging apparatus.

As the crank member 185 and its depending mechanism moves the collecting and transferring unit 139 through one-quarter of a cycle, i. e. moves the stack of inspected crackers 263 from the collecting station to the transferring station, the shaft 170 moves the cam 256 to bring the next flat 258 beneath the switch 259, whereupon said switch 259 is opened and the relay 252 energized to again close the circuit of the solenoid 225, whereupon the cycle described above starts over again.

In practice, the speed of operation of the rotary selector member 71 is set so that the period for each one-quarter cycle of operation of the collecting and transferring unit 139 is considerably longer than the time required for the selector member 71 to count out the predetermined number of crackers 263. For example, in one commercial embodiment of my invention, a total of sixteen crackers could be counted out during each one-quarter cycle of operation of the unit 139; however it is desired that only eleven crackers be counted out, since this number happens to constitute one-quarter of a pound of crackers, which is a convenient quantity to wrap and package. Thus, some five crackers could be rejected by the apparatus as being imperfect, yet said apparatus would still stack the predetermined number of crackers in the unit 139 in each one-quarter cycle of operation of said unit 139. Actually, the chance of having even five imperfect crackers out of each sixteen crackers is very small. Thus, the possibility that the apparatus will not stack the predetermined number of crackers in the unit 139 is so slight as not to have any practical significance.

Advantageously, the aforesaid apparatus may be modified to provide complete, automatic inspection of each cracker without any attention on the part of the operator, so that if desired, one operator can tend a whole battery of my machines. More particularly, this desirable objective is achieved by means of the apparatus shown somewhat schematically in Figures 13 and 14. In addition to the one set of endless belts 104, 104, supported and operated in the manner of the apparatus of Figures 1-12, this modified apparatus includes a second pair of endless belts 264, 264. Pulleys 265 and sleeves 266 journaling the shafts 267 of said pulleys 265, position and drive the endless belts 264 in the manner indicated in Figures 13 and 14. As in the case of the apparatus of Figures 1-12, the endless belts 104, 104 act to inspect the upper corners of each cracker 263, as well as test it for breaks in a more or less vertical plane. The belts 264, 264 are positioned beneath the belts 104, 104 and overlap the travel of said belts 104, 104 to receive the crackers 263 therefrom, and to grip them at the bottom corners. In this way, the lower corners of each of the crackers 263 are inspected, and if broken or damaged said cracker falls from between the belts 264, 264. Thus there is no need for the conveyor rails 49, 49 of Figures 2-4, so that these elements may be removed from the chute 44. When the embodiment of Figures 13 and 14 is used, the light generating unit 236 and the phototube unit 237 are positioned on opposite sides of the endless belts 264, 264, preferably just before the crackers 263 are discharged therefrom into the unit 139. In all other respects, the modified apparatus of Figures 13 and 14 operates as does the apparatus of Figures 1-12.

Having thus fully disclosed my novel article handling apparatus, and demonstrated its utility by reference to two specific embodiments thereof, I claim as my invention:

1. Tablet counting, inspecting and stacking apparatus comprising: means for receiving in a stack of edgewise supported, unsorted, substantially rectangular tablets, means for successively selecting and separating the foremost tablet from the stack thereof in said receiving means, conveyor means positioned to engage vertical edges of said tablets as they are separated from said stack and thereby to inspect each of said tablets for fractures as it is transferred from said stack, means for collecting said inspected tablets from said conveyor means, means to stop said selecting means after a predetermined number of tablets are discharged into said tablet collecting means, means for removing periodically the tablets in said tablet collecting means, the operative period of said tablet collecting and removing means being longer than the time required for said selecting and separating means to remove said predetermined number of tablets from said stack of tablets in said receiving means, and means actuated by said tablet removing means to engage said selecting and separating means each time said tablets are removed from said collecting means.

2. Counting, inspecting, and stacking apparatus for relatively thin tablet-like articles of substantially rectangular shape and uniform size, comprising: means for receiving in stacked relation an unsorted, substantially horizontal series of said articles, means for successively displacing the foremost article in said receiving means to incline said article from the vertical with the weight of said article supported substantially entirely by the upper and lower edge portions thereof, whereby articles which are broken horizontally fall by gravity from said article displacing means, means for conveying said articles by applying forces at opposite vertical edge portions thereof, said conveying means positioned to receive said partially inspected articles after they have been displaced by said displacing means, whereby articles which are broken vertically are not carried along by said conveyor means but fall by gravity therefrom, drive means for said article displacing means, means for collecting said inspected articles in stacked relation from said conveying means, means to disengage said drive means after a predetermined number of inspected articles are discharged into said collecting means, and means for removing said predetermined number of stacked articles from said collecting means and thereafter engaging said drive means.

3. Counting, inspecting, and stacking apparatus for relatively thin tablet-like articles of substantially uniform size, comprising: means for receiving in stacked relation a supply of unsorted articles, primary inspection means for successively displacing the upper edge portion of the foremost article in said article receiving means so that said article is inclined from the vertical, whereby articles which are broken horizontally and cannot support their own weight fall by gravity from said article displacing means, secondary inspection means for conveying said articles by applying forces only at opposite vertical edge portions thereof, said conveying means positioned to receive said articles after they have been displaced by said primary inspection means, whereby articles which are broken vertically fall by gravity from said conveyor means, drive means for said displacing means and said conveying means, means for collecting said inspected articles in stacked relation as they are discharged from said conveying means, disengagement means actuated by said articles while in one of said inspection means to disengage said drive means after a predetermined number of inspected articles have been discharged into said collecting means, and means for removing said predetermined number of stacked articles from said collecting means and thereafter engaging said drive means.

4. Apparatus for handling and inspecting tablet-like articles of substantially uniform size, comprising: means for stacking a supply of unsorted articles on edge, a substantially cylindrical, rotatable member, means positioning said member with the principal axis thereof substantially parallel to and above the upper edge of the foremost article in said article stacking means, said foremost article bearing against said member, said member having at least one slot therein extending substantially radially of said principal axis, the sides of said slot diverging away from each other as said slot opens into the interior of said member, the width of said slot at the surface of said member being somewhat greater than the thickness of an article, a guide element extending above and forwardly of the lower edge of the foremost article, whereby during each revolution of said member the upper edge portion of the foremost article displaces into said slot and is separated from the adjacent article in said article stacking means, the lower edge portion of the selected article being momentarily constrained by said guide element so that said article is inclined from its original position in said article stacking means, and means for conveying said article from said member including mechanism for gripping said articles by pressing against opposite vertical edges thereof.

5. Apparatus for handling and inspecting tablet-like articles of substantially uniform size, comprising: means for stacking a supply of unsorted articles, means for successively displacing the upper edge portion of the foremost article in said article stacking means so that said article is inclined from the vertical, two endless belts, and belt support means positioning two spans of said belts substantially parallel to each other and on opposite sides of said article displacing means, the spacing between said spans being not greater than the distance between two opposite vertical edges of an article, whereby as said article is inclined from the vertical said endless belts grip said opposite edges of said article and carry it clear of said displacing means.

6. Apparatus for handling and inspecting tablet-like articles of substantially uniform size, comprising: means for stacking a supply of unsorted articles on edge, a substantially cylindrical, rotatable member, means positioning said member with the principal axis thereof substantially parallel to and above the upper edge of the foremost article in said article stacking means, said foremost article bearing against said member, said member having at least one slot therein extending substantially radially of said principal axis, the sides of said slot diverging away from each other as said slot opens into the interior of said member, the width of said slot at the surface of said member being somewhat greater than the thickness of an article, a curved guide element extending above and forwardly of the lower edge of the foremost article, whereby during each revolution of said member the upper edge portion of the foremost article displaces into said slot and is separated from the adjacent article in said article stacking means, the lower edge portion of the selected article being momentarily constrained by said guide element so that said article is inclined from its original position in said article stacking means, two endless belts, and belt support means positioning two spans of said belts substantially parallel to each other and on opposite sides of said rotatable member, the spacing between said two spans being not greater than the distance between two opposite vertical edges of an article, whereby said rotatable member carries the selected article between said parallel spans of said endless belts, whereupon said belts grip said opposite edges of said article and carry it clear of said member.

7. Apparatus for handling and inspecting tablet-like articles of substantially uniform size, comprising: means for stacking a supply of unsorted articles, a member movable relative to the stack of articles in a recurring cycle, said stack of articles bearing against said member and being restrained in place thereby, means on said member for engaging and removing the foremost article only from said stack thereof, a first pair of spaced pulleys mounted for rotation in a single plane which intersects and is substantially perpendicular to two opposite edges of an article selected by said member, a first endless belt running over said first pair of pulleys, a second pair of pulleys mounted for rotation in said single plane and a second endless belt running over said second pair of pulleys, said pairs of pulleys being further positioned to align adjacent spans of said endless belts substantially parallel to each other, whereby said belts may transport an article by gripping said two opposite edges thereof.

8. In apparatus for handling tablet-like articles of substantially uniform size, article collecting, delivering and inspecting mechanism comprising in combination: a pair of spaced pulleys and a conveyor belt running over said pulleys, means for transferring unsorted articles onto the upper span of said conveyor belt in stacked relation with said articles arranged on edge, means for driving said conveyor belt to move said articles toward one end of said upper span thereof, means for aligning said articles vertically and laterally on said belt, an article selector member movable relative to the aligned stack of articles in a recurring cycle, means positioning said selector member to contact the upper edge portion of the foremost article in said stack, means on said selector member for separating the upper edge portion of the foremost article in said stack from the next adjacent article, and a guide element positioned substantially below said selector member and extending above and in contact with the lower edge of said foremost article, whereby said lower edge must be moved upwardly to clear said guide element, said guide element thereby momentarily constraining said lower edge as said selector member displaces the upper edge portion of said foremost article, whereby said foremost article is inclined from its original position and supported in the inclined position by its own bending strength, whereby articles broken in a horizontal plane collapse and fall from said selector member.

9. In apparatus for handling thin tablets of substantially uniform size, tablet collecting, delivering and inspecting mechanism comprising in combination: a pair of spaced pulleys and an endless conveyor belt running over said pulleys, means for transferring unsorted tablets onto one end of the upper span of said conveyor belt in stacked relation with said tablets arranged on edge, a substantially straight aligning bar positioned along one side of said upper span and extending convergently toward the other end of said upper span, whereby said tablets are aligned laterally as they are moved toward said other end of said upper span, a ramp positioned forwardly of said other end of said upper span and contoured to first elevate and then lower tablets which are fed thereon from said upper span, an aligning member positioned substantially over said ramp to align said tablets vertically, a guide element positioned forward of and above said ramp to serve as a stop against which the lower edge portion of the foremost tablet bears as it moves down said ramp, a tablet selector member movable relative to the stack of tablets in a recurring cycle, means positioning said selector member substantially above said guide element and in alignment with the upper edge portion of said foremost tablet, means driving one of said pulleys to move said tablets toward and into contact with said guide element and said selector member, said driving means including an adjustable slip clutch whereby the maximum compressive force exerted on said tablets disposed on said conveyor cannot exceed a predetermined value, and means on said selector member for separating the upper edge portion of the foremost tablet in said stack from the next adjacent tablet, said guide element momentarily constraining the lower edge portion of said foremost tablet, whereby said foremost tablet is inclined from its original position and supported in the inclined position by its own bending strength, whereby tablets broken in a horizontal plane collapse and fall from said selector member.

10. Apparatus of the type defined in claim 9 wherein said selector member and said tablet separating means thereon comprise: a substantially cylindrical, rotatable member, means supporting said member with the principal axis thereof substantially parallel to the upper edge of the foremost tablet in said stack, said member having at least one slot in the body thereof which intersects the cylindrical surface of said member, said slot undercutting said surface to form two lip portions having two spaced apart edges substantially parallel to said principal axis of said member, the spacing between said edges being somewhat greater than the thickness of a tablet, whereby during each revolution of said member the lagging lip portion slips between said upper edge portion of said foremost tablet and the next succeeding tablet, to position said upper edge portion in said pocket between said parallel edges thereof, whereupon further rotation of said member separates said upper edge portion of said foremost tablet progressively further from the next succeeding tablet.

11. A rotary separator device for separating tablet-like articles one at a time from the forward end of an oncoming stack thereof while preventing the stack from advancing as each separated article is being handled by said device, comprising: a substantially cylindrical, rotatable member, means supporting said member with the principal axis thereof substantially parallel to and above the upper edge of the foremost tablet in said stack, said member having at least one slot in the body thereof which intersects the cylindrical surface of said member, said slot undercutting said surface to form two lip portions having two spaced apart edges substantially parallel to said principal axis, the distance between said parallel edges being somewhat greater than the thickness of one of said articles, whereby during each revolution of said member the lagging lip portion slips between said upper edge portion of the foremost article in said stack and the next succeeding article, to position said upper edge portion in said pocket between said parallel edges thereof, whereupon further rotation of said member separates said upper edge portion of said foremost article progressively further from the next succeeding article.

12. The rotary separator device defined in claim 11 wherein the inner surfaces of said two lip portions are divergently beveled.

13. The rotary separator device as defined in claim 11 wherein the cylindrical member is a smooth surfaced cylindrical shell split into two halves by diametrically opposed slot openings therethrough, the edges of which are substantially parallel to the principal axis of said shell, the two edges of each slot forming said two lip portions, and a cross member supporting said two halves and extending diametrically therebetween in a plane substantially perpendicular to the plane of said slot openings.

14. Apparatus for conveying and inspecting thin tablet-like articles of substantially uniform size, comprising: a first pair of pulleys, means for mounting said first pair of pulleys for rotation in a single vertical plane, a first endless belt running over said first pair of pulleys, a second pair of pulleys, means for mounting said second pair of pulleys for rotation in said single plane, and a second endless belt running over said second pair of pulleys, said pairs of pulleys being further positioned to align adjacent spans of said endless belts substantially parallel to each other and spaced apart a distance substantially equal to but not greater than the normal distance between two opposite edges of an article, so that said belts will transport an article by gripping said opposite edges thereof while not transporting an article having a defective or broken edge or a vertical fracture; at least one of said belts comprising a substantially non-stretchable backing strip, and a soft, resilient facing secured to said backing strip, said belt being mounted on its respective set of pulleys to present said facing to the article gripped between said belts and at least one roller positioned intermediate one of said pairs of pulleys and mounted for rotation in the plane of said pulleys, said roller bearing against the inner side of said pulleys' respective belt so as to support the span of said belt against movement away from the adjacent span of the other belt.

15. Apparatus of the type defined in claim 14, in which at least one of said pulley mounting means is shiftable to vary the distance between said parallel spans of said belts, and spring means urging said shiftable mounting means to decrease the distance between said parallel spans so as to accommodate only slight variances in size of the articles transported.

16. Apparatus for conveying and simultaneously inspecting the corners of a substantially rectangular article, comprising: a first and a second conveyor belt, support means for each of said first and second belts positioning adjacent spans thereof substantially parallel to each other, said parallel spans of said first and second belts being spaced apart a distance substantially equal to but not greater than the distance between two opposite edges of said article to be conveyed, a third and a fourth conveyor belt, support means for each of said third and fourth belts positioning adjacent spans thereof substantially parallel to each other, said parallel spans of said third and fourth belts being spaced apart a distance substantially equal to but not greater than the distance between said two opposite edges of said article, said first and second spans overlapping said third and fourth spans for a portion of their length and spaced therefrom a distance whereby said first and second spans convey said article by gripping two corners on said opposite edges thereof and thereafter transfer said article to said third and fourth spans to be gripped at the other two corners of said article, whereby an article having a defective or broken corner falls from said conveying apparatus.

References Cited in the file of this patent

UNITED STATES PATENTS

| Number | Name | Date |
| --- | --- | --- |
| 277,488 | Husted | May 15, 1883 |
| 1,341,463 | Hazard | May 25, 1920 |
| 1,568,594 | Flint | Jan. 5, 1926 |
| 1,588,903 | Parker | June 15, 1926 |
| 1,791,399 | Den Boer | Feb. 3, 1931 |
| 1,920,563 | Jahne | Aug. 1, 1933 |
| 2,297,295 | Flintjer | Sept. 29, 1942 |
| 2,369,794 | Phinney | Feb. 20, 1945 |
| 2,414,059 | Powers | Jan. 7, 1947 |
| 2,424,103 | Lobley | July 15, 1947 |
| 2,493,464 | Nelson | Jan. 3, 1950 |
| 2,519,491 | Monaco | Aug. 22, 1950 |